US006996818B2

(12) United States Patent
Jacobi et al.

(10) Patent No.: US 6,996,818 B2
(45) Date of Patent: Feb. 7, 2006

(54) UPDATE SYSTEM FOR FACILITATING SOFTWARE UPDATE AND DATA CONVERSION IN AN ELECTRONIC DEVICE

(75) Inventors: Sidney Andrew Jacobi, San Marcos, CA (US); Toni Pakarinen, Ladera Ranch, CA (US); Bindu Rama Rao, Laguna Niguel, CA (US)

(73) Assignee: Bitfone Corporation, Laguna Niguel, CA (US)

( * ) Notice: Subject to any disclaimer, the term of this patent is extended or adjusted under 35 U.S.C. 154(b) by 0 days.

(21) Appl. No.: 10/697,458

(22) Filed: Oct. 30, 2003

(65) Prior Publication Data

US 2004/0226008 A1 Nov. 11, 2004

Related U.S. Application Data

(60) Provisional application No. 60/428,396, filed on Nov. 22, 2002.

(51) Int. Cl.
*G06F 9/44* (2006.01)
(52) U.S. Cl. ............... 717/170; 717/172; 717/177; 709/223
(58) Field of Classification Search ........ 717/168–178, 717/136, 120–122; 719/321, 327, 319; 711/100, 102–106; 709/223
See application file for complete search history.

(56) References Cited

U.S. PATENT DOCUMENTS

| 5,261,055 | A | | 11/1993 | Moran et al. ............... 395/275 |
|---|---|---|---|---|
| 5,410,703 | A | * | 4/1995 | Nilsson et al. ............. 717/168 |
| 5,442,771 | A | | 8/1995 | Filepp et al. ............... 395/650 |
| 5,479,637 | A | | 12/1995 | Lisimaque et al. ......... 395/430 |
| 5,579,522 | A | | 11/1996 | Christeson et al. ......... 395/652 |
| 5,596,738 | A | | 1/1997 | Pope ......................... 395/430 |
| 5,598,534 | A | | 1/1997 | Haas ..................... 395/200.09 |
| 5,608,910 | A | | 3/1997 | Shimakura .................. 395/670 |
| 5,623,604 | A | | 4/1997 | Russell et al. ........... 395/200.1 |
| 5,666,293 | A | | 9/1997 | Metz et al. .............. 395/200.5 |
| 5,752,039 | A | | 5/1998 | Tanimura .................... 395/712 |
| 5,778,440 | A | | 7/1998 | Yiu et al. .................. 711/154 |
| 5,790,974 | A | | 8/1998 | Tognazzini ................. 701/204 |
| 5,878,256 | A | | 3/1999 | Bealkowski et al. ........ 395/652 |
| 5,960,445 | A | | 9/1999 | Tamori et al. .............. 707/203 |
| 6,009,497 | A | | 12/1999 | Wells et al. ................ 711/103 |
| 6,038,636 | A | | 3/2000 | Brown, III et al. ......... 711/103 |
| 6,064,814 | A | | 5/2000 | Capriles et al. ............. 395/701 |
| 6,073,206 | A | | 6/2000 | Piwonka et al. ............ 711/102 |

(Continued)

FOREIGN PATENT DOCUMENTS

CA 2339923 3/2000

(Continued)

*Primary Examiner*—Antony Nguyen-Ba
(74) *Attorney, Agent, or Firm*—McAndrews, Held & Malloy, Ltd.

(57) ABSTRACT

Disclosed herein is a method of updating an electronic device employing a firmware/software update system. The firmware/software may be updated through use of update information retrieved from a server. The server may support conversion of data associated with an updated firmware/software. An update agent may be capable of processing the update information retrieved from the server and updating the firmware/software in the electronic device. The update agent may also be capable of invoking a converter utility to convert data associated with the firmware/software to be compatible with a newer version of the firmware/software. When the firmware/software is updated, corresponding data may also be updated in a single update event by employing an associated converter utility that may be retrieved along with the update information.

39 Claims, 3 Drawing Sheets

U.S. PATENT DOCUMENTS

| | | | |
|---|---|---|---|
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,272,333 B1 * | 8/2001 | Smith | 455/418 |
| 6,279,153 B1 | 8/2001 | Bi et al. | 717/11 |
| 6,311,322 B1 | 10/2001 | Ikeda et al. | 717/1 |
| 6,438,585 B2 | 8/2002 | Mousseau et al. | 709/206 |
| 6,587,684 B1 * | 7/2003 | Hsu et al. | 455/419 |
| 6,658,090 B1 * | 12/2003 | Harjunen et al. | 379/9.01 |
| 2001/0008024 A1 * | 7/2001 | Inaba | 717/11 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2002/0194532 A1 * | 12/2002 | Nagasawa | 714/11 |
| 2003/0005426 A1 * | 1/2003 | Scholtens et al. | 717/169 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2003/0092438 A1 * | 5/2003 | Moore et al. | 455/423 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

* cited by examiner

UPDATE SYSTEM FOR FACILITATING SOFTWARE UPDATE AND DATA CONVERSION IN AN ELECTRONIC DEVICE

CROSS-REFERENCE TO OTHER APPLICATIONS

The present application claims the benefit of U.S. Provisional patent application having Ser. No. 60/428,396, filed on Nov. 22, 2002, and hereby incorporates herein by reference the complete subject matter thereof in its entirety.

The present application also hereby incorporates herein by reference the complete subject matter of PCT application having publication number WO/02/41147 A1, and having application number PCT/US01/44034, filed on Nov. 19, 2001, in its entirety.

The present application also hereby incorporates herein by reference the complete subject matter of the following U.S. Provisional patent applications: Ser. No. 60/249,606 filed on Nov. 17, 2000; Ser. No. 60/401,054 filed on Aug. 05, 2002; and Ser. No. 60/410,071 filed on Sep. 12, 2002, in their respective entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs, introduce new features, or both.

However, with software updates, data stored or created by an older version of software may not be compatible with a newer version of the software, especially if the schema of a database or the structure of data has changed between the present version and the newer version. Previously stored or created data may not be accessible by the newer version of the software.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in a method for updating an electronic device. The method may comprise updating a first code version in the electronic device to a second code version using update information comprising a set of instructions for converting the first code version to the second code version, and converting data associated with the first code version to a form compatible with an the second code version.

In an embodiment of the present invention, the method may further comprise retrieving a list of names of converter utilities associated with the update information.

In an embodiment of the present invention, the method may further comprise storing update information in at least a portion of memory in the electronic device.

In an embodiment of the present invention, the method may further comprise communicating queries regarding availability of update information from the electronic device to a server.

In an embodiment of the present invention, the method may further comprise retrieving the update information and a list of names of converter utilities in a single retrieval operation.

In an embodiment of the present invention, the first code version may comprise a plurality of software applications, and each of the plurality of software applications may be associated with a corresponding converter utility.

In an embodiment of the present invention, the update information may be capable of updating the plurality of software applications in a single update event.

In an embodiment of the present invention, the method may further comprise generating an update package reference, the update package reference may at least comprise an update package location memory reference and a list of names of converter utilities memory reference.

In an embodiment of the present invention, the method may further comprise determining whether a code update is necessary, and if it is determined that an update is not necessary, then performing a reboot operation.

In an embodiment of the present invention, the method may further comprise determining whether a code update is necessary. If it is determined that an update is necessary, then retrieving data from an update package reference, verifying authenticity of the update information, updating the first code version, executing at least one converter utility associated with at least one software application, communicating an update confirmation to at least one external system, and performing a reboot operation.

In an embodiment of the present invention, executing at least one converter utility associated with the at least one software application may comprise retrieving and updating associated security information.

In an embodiment of the present invention, retrieving and updating associated security information may comprise retrieving an authorization related object and associating it with the at least one software application.

In an embodiment of the present invention, the method may further comprise retrieving a list of security information associated with the update information, and installing the security information after updating the first code version.

In an embodiment of the present invention, executing at least one converter utility associated with the at least one software application may comprise converting security information comprising authentication and authorization information.

In an embodiment of the present invention, executing at least one converter utility associated with the at least one software application may comprise converting subscription information.

In an embodiment of the present invention, the first code version may comprise a plurality of software applications. The at least one converter utility may comprise a plurality of converter utilities. Each converter utility may be associated with a corresponding application software application.

In an embodiment of the present invention, each of the software applications for which an update was determined to be necessary may be updated in a single update event.

In an embodiment of the present invention, executing at least one converter utility associated with the at least one software application may comprise converting data associated with each software application in a single conversion event.

In an embodiment of the present invention, code may comprise firmware.

Another aspect of the present invention may be found in a machine-readable storage, having stored thereon a computer program having a plurality of code sections. The code sections may be executable by a machine for causing the machine to perform operations for updating an electronic device. Such an embodiment may comprise code comprising an update agent, for coordinating updating of code in the electronic device using update information comprising a set of instructions for converting the code to an updated code, and code comprising a converter, for invoking a converter utility associated with the code and for converting data associated with the code to a form compatible with an updated version of the code.

In an embodiment of the present invention, the electronic device may comprise a communication layer for communicating a list of names of converter utilities associated with the update information and communicating queries regarding availability of update information from the electronic device to a server.

In an embodiment of the present invention, the communication layer may be adapted to communicate the update information and the list of names of converter utilities in a single communication event.

In an embodiment of the present invention, the electronic device may comprise memory for storing update information.

In an embodiment of the present invention, the code may comprise a plurality of software applications and each of the software applications may be associated with a corresponding converter utility.

In an embodiment of the present invention, the update information may be adapted to update the plurality of software applications in a single update event.

In an embodiment of the present invention, the machine-readable storage may comprise a placement layout table for mapping a memory location of update information. The placement layout table may at least map an update information memory location and a list of names of converter utility memory location.

In an embodiment of the present invention, the machine-readable storage may comprise means for determining whether an update of code is necessary. If it is determined that an update is not necessary, then the electronic device performs a reboot operation.

In an embodiment of the present invention, the machine-readable storage may also comprise means for determining whether an update of the code is necessary. If it is determined that an update is necessary, then the update agent may retrieve data from an update package reference, verify authenticity of the update information, and update the code. The converter may execute at least one converter utility associated with the code. A communication layer may communicate an update confirmation to at least one external system, and the electronic device may perform a reboot operation.

In an embodiment of the present invention, the code may comprise a plurality of software applications. The at least one converter utility may comprise a plurality of converter utilities. Each converter utility may be associated with a corresponding software application.

In an embodiment of the present invention, the update agent may be adapted to update each of the software applications for which an update was determined to be necessary in a single update event.

In an embodiment of the present invention, the converter may execute at least one converter utility associated with each software application and may convert data associated with each of the software applications in a single conversion event.

In an embodiment of the present invention, the converter may convert security data associated with the code. The converted security data may enable access to the updated version of the code.

In an embodiment of the present invention, the electronic device may comprise a communication layer. The communication layer may communicate converter utilities. The converter utilities may be adapted to converting security data and access control information associated with the update information. The communication layer may also communicate information associated with the converted security data and access control information from the electronic device to a server.

In an embodiment of the present invention, a converter utility may invoke downloading of update information and firmware/software update information.

In an embodiment of the present invention, security information may be updated after a software/firmware update has been performed.

In an embodiment of the present invention, a software application may be updated when data associated with the software application changes.

In an embodiment of the present invention, code may comprise firmware.

These and various other advantages and features of novelty which may characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DIAGRAMS

DETAILED DESCRIPTION OF THE DIAGRAMS

Figure 1:
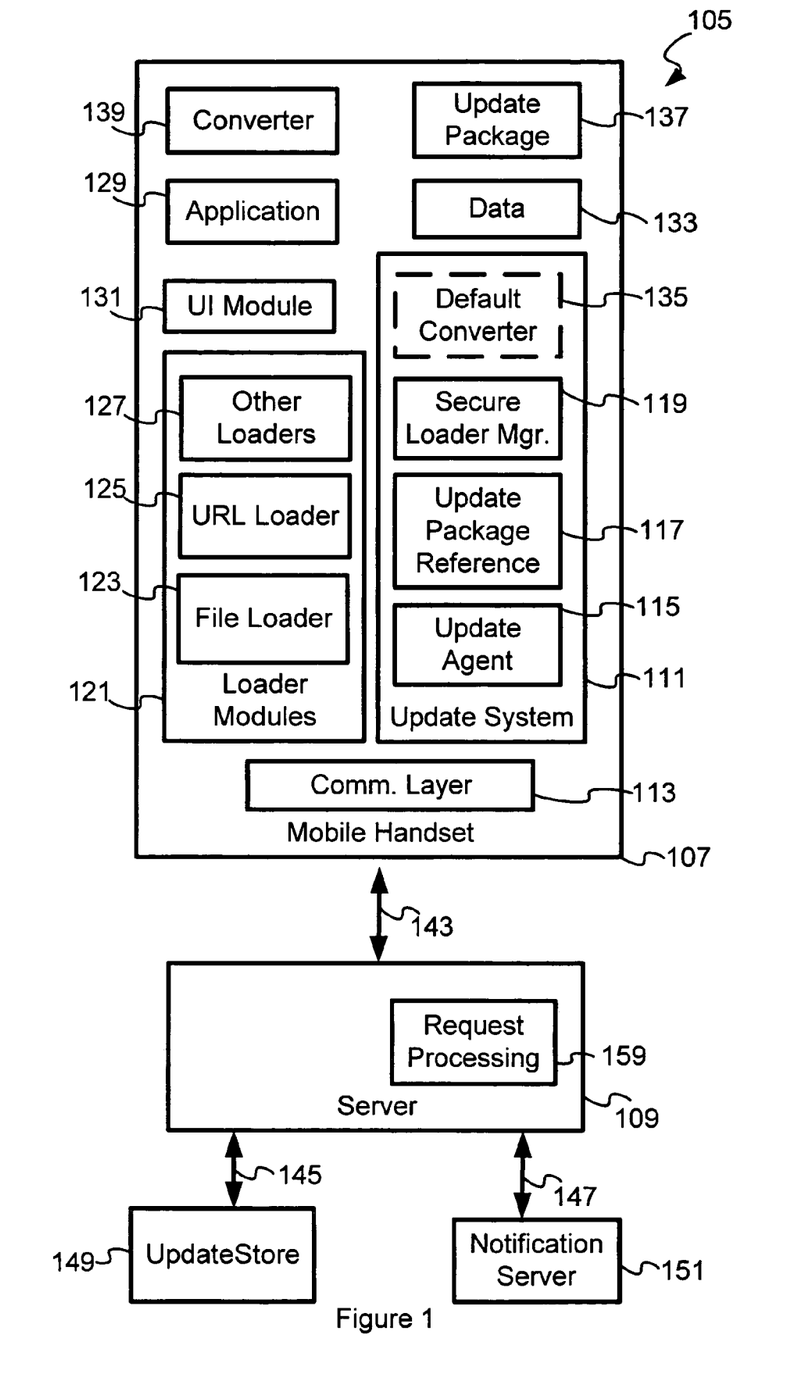
FIG. 1 illustrates a block diagram of an update network for updating an electronic device according to an embodiment of the present invention.

FIG. 1 illustrates a block diagram of an update network 105 for updating an electronic device according to an embodiment of the present invention. Mobile handset 107 is one example of an electronic device in which an embodiment of the present invention may be practiced. Mobile handset 107 may employ firmware/software update system 111 for updating the mobile handset firmware/software based upon information contained in at least one update package retrieved from server 109. In a representative embodiment of the present invention, an update package (that may be referred to herein as update information) may comprise a plurality of transformation instructions which transform a first code version into a second code version. In one aspect, the instruction set utilizes a conversion process employed by a client device such as, for example, the mobile handset 107 to efficiently convert an existing the first code version to the second code version. The mobile handset 107 may be communicatively coupled to server 109 via communication link 143.

Update agent 115 in update system 111 may be capable of processing one or more update package(s), and other related information, retrieved from server 109. The update agent 115 may also be capable of updating the firmware/software in the mobile handset 107. Update agent 115 may also be capable of invoking converter utility 139 to convert data 133 associated with the firmware/software to a state where the converted data is compatible with a newer version of the firmware/software.

Update system 111 may be adapted to update firmware/software to newer or different versions, or both. Mobile handset 107 may also comprise communication layer 113 to communicate with server 109. Server 109 may employ one of several possible data transport mechanisms. The mobile handset 107 may also comprise loader modules 121 supporting download of one or more update package(s) from server 109. Server 109 may also employ communication layer 113.

The mobile handset 107 may also comprise firmware/software which may be updated, and application software 129 is an example of firmware/software which may be updated. Mobile handset 107 may also comprise data 133 associated with application software 129. Data 133 may be convertible from one firmware/software version to another. Mobile handset 107 may also comprise converter 139 capable of converting data 133 from one firmware/software version to another. The mobile handset 107 may also comprise update package 137. Update package 137 may be downloaded from server 109 to update the firmware/software, or application software 129, for example, in the mobile handset 107.

Application software 129 in mobile handset 107 creates or manages data 133 that may continue to be accessed and manipulated despite updates to the application software 129. Conversion of the format or content of data 133 may be accomplished through the application of an associated converter utility 139. The converted data 133 may be compatible with newer or different versions, or both, of application software 129. The format of data 133, used by an updated version of firmware/software, for example, application software 129, may be different than that used by the prior version of the application software 129.

Server 109 may be communicatively coupled to update store 149 via communication link 145. Update store 149 may be used to store one or more update packages along with associated metadata. Update store 149 may also store converter utilities that may be retrieved by mobile handset 107 when specific update packages are retrieved by the mobile handset 107. Update store 149 may provide a management interface that supports loading of multiple update packages, their associated metadata, and associated converter utilities into the update store 149 for subsequent retrieval by mobile handset 107.

Mobile handset 107 may communicate queries to server 109 to determine whether an update package is available. The mobile handset 107 may also communicate queries to server 109 to retrieve update packages and other related information (e.g., metadata). Request processing module 159 in server 109 may process incoming queries from mobile handset 107, and may instruct server 109 to retrieve update packages, metadata information, and/or converter utilities from update store 149 for subsequent dissemination to a plurality of electronic devices, such as for example, mobile handset 107. In an embodiment of the present invention, server 109 may also include update store 149 therein. The request processing module 159 may also process notifications of potential updates received from notification server 151 via communication link 147. As updates and/or new services become available, the server 109 in communication with mobile handset 107 will be notified of the availability of the updates and/or new services and will determine whether to make the updates and/or new services available to mobile handsets in the update network 105.

In an embodiment of the present invention, in order to update application software 129 to a different version, mobile handset 107 may retrieve an update package and may also retrieve an associated data converter utility 139. If used, the data converter utility 139 may be employed to update the format or content of data 133 associated with the application software 129 being updated by update agent 111 employing downloaded update package 137.

For example, when mobile handset 107 retrieves an update package from server 109 to update application software 129, the mobile handset 107 may also simultaneously retrieve an associated (or corresponding) converter 139 from server 109. The retrieved converter 139 may convert the data 133 to a state where the converted data may be compatible with an updated version of application software 129. Update agent 115 may update application software 129 to a newer version and immediately thereafter, invoke the downloaded converter 139 to convert the data 133 to make the data 133 compatible with the newer version of application software 129.

In an embodiment of the present invention, update package 137 may incorporate a converter utility that may be invoked by update agent 115 following an update of application software 129 in mobile handset 107. The name of the converter utility to be invoked may be communicated to mobile handset 107 by server 109, when the update package is retrieved by mobile handset 107. The name of the converter utility may be available in the update store 149 for retrieval by server 109, having been previously loaded into update store 149 via a management module provided by the update store 149.

In an embodiment of the present invention, the converter 139 may be made available after the retrieved update package 137 has been processed and the application software 129 has been updated. The converter 139 may be invoked by update agent 115 to convert the data 133 of application software 129 into a format that is compatible with the newer, updated version of application software 129. The name of the converter utility may be retrieved by update agent 115 from information communicated to mobile handset 107 along with update package 137.

In an embodiment of the present invention, a plurality of software applications may be installed in the mobile handset 107. An update package, such as update package 137, may be capable of updating each of the plurality of software applications individually, or simultaneously in a single update event, i.e., from a single update package 137. When mobile handset 107 retrieves an update package containing updates for the plurality of software applications, the updates may correspond to newer versions of each of the plurality of software applications, and a converter utility may be invoked by update agent 115 for each software application. The update agent 115 may invoke at least one of a plurality of respective converter utilities for each of the plurality of updated software applications, after the retrieved update package has been installed. The names of the converter utilities corresponding to each respective software application may be communicated to the update agent 115 together with data retrieved with the update package from server 109. The query that retrieves the update package from the server 109 may also retrieve the names of associated converter utilities. In an embodiment of the present invention, retrieval of the associated metadata of the update package from server 109 may also retrieve a list of names of the respective associated converter utilities. The converter utilities may also be provided in the updated software applications supported in the update package.

The server 109 may also communicate the names of the respective converter utilities, or the names may be provided by the updated software applications generated using the update package. The converter utilities may be invoked after a software update, to convert the format or content of data 133. The server 109 may also provide a list of names of respective converter utilities for each of the respective software applications impacted by an update package in a response to a query for metadata by the mobile handset. The server 109 may also provide the names of respective converter utilities along with an update package, when a request for the update package is processed by the server. Other means of communicating names of converter utilities associated with an update package are also contemplated.

Loader modules 121 may support a plurality of loaders, such as the file loader 123, universal resource locator (URL) loader 125, or other loaders 127. The loader modules 121 facilitate loading and/or retrieval of data and/or files into mobile handset 107 for display and/or for processing. Secure loader manager 119 may employ one of the loader modules 121 to retrieve/load an update package from server 109, or from a local file system in mobile handset 107.

The secure loader manager 119 may facilitate the secure download of update packages and other information from external systems such as server 109. The secure loader manager 119 manages the secure communication of parameters such as, for example, a manufacturer identifier, model information, and hardware or software version numbers, to server 109 employing appropriate message formats and commands, and incorporating appropriate security mechanisms. The secure loader manager 119 may also coordinate verification of the authenticity of the received information being stored in mobile handset 107.

The secure loader manager 119 may also coordinate setting of various flags and status information in mobile handset 107, and may employ the update package reference 117 as a repository of information, such as, for example, status information, flags, configuration parameters, names of converter utilities, etc. Subsequent to successful download and verification of an update package 137 for software updates, secure loader manager 119 may set a flag or a change indicator, and may also set other related information, such as cyclic redundancy check (CRC) values, etc., in the update package reference 117 indicating that an update of the firmware/software of the mobile handset is to be performed the next time the mobile handset is restarted or power cycled.

In an embodiment of the present invention, the secure loader manager 135 may set the values stored in the update package reference 117. The update package reference 117 may be stored in a section of memory of the mobile handset 107, so that the update agent 115 may access and read the update package reference. The update package reference 117 may comprise, for example, a 4-byte state flag (on/off flags), an address referencing the downloaded update package, an address referencing a backup section, a 4-byte CRC value based on the 16-byte flag sections, a list of names of converter utilities, and other related information. Update agent 115 may read the update package reference 117 when the mobile handset 107 is restarted/rebooted, to update the firmware/software of mobile handset 107, and to determine the names of the converter utilities that may be invoked.

Figure 2:
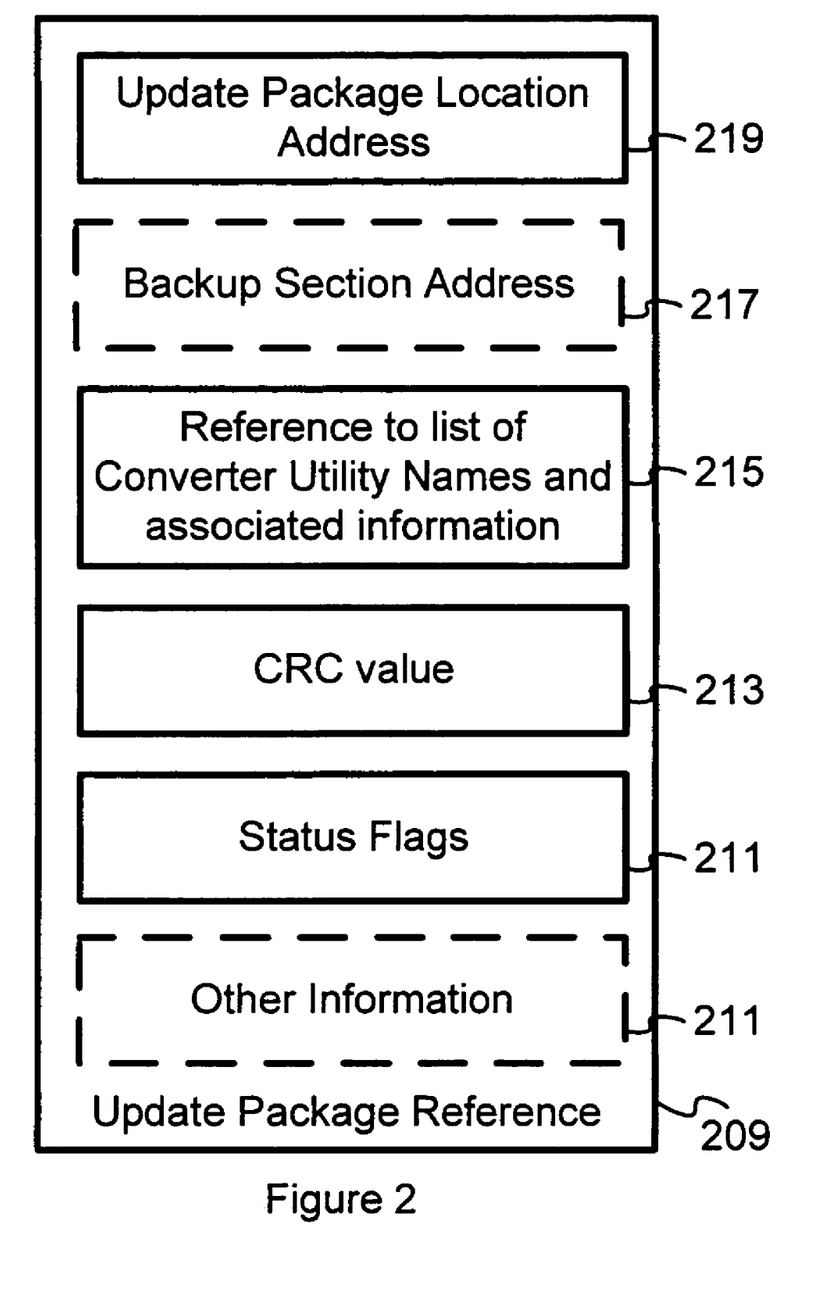
FIG. 2 illustrates a block diagram of an exemplary update package reference section of memory employed by the update system according to an embodiment of the invention.

FIG. 2 illustrates a block diagram of an exemplary update package reference section of memory employed by the update system according to an embodiment of the present invention. The block diagram illustrates an update package reference 209 section of memory that may be employed by, for example, update system 111 of FIG. 1, to communicate information related to update package 137 and a list of names of converter utilities to the update agent 115. The update package reference 209 may correspond to, for example, the update package reference 117 disclosed in FIG. 1.

The update package reference 209 may comprise an update package location address 219, such as a 4-byte address. The update package reference 209 may also comprise an optional backup section address 217, which may be, for example, 4-byte address of a segment of memory which is employed for storing data during an update process. The update package reference 209 may also comprise a reference to a list of names of converter utilities and other associated information 215 that may specify names of converter utilities to be invoked following update of specific applications or components.

The update package reference 209 may also comprise a CRC value 213 employed for authentication purposes or to identify specific update packages and status flags 211 used to determine the need to update firmware/software. The update package reference 209 may also comprise an optional section 211 used to save other related information such as, for example, error messages encountered by conversion utilities and update processing code.

In an embodiment of the present invention, other mechanisms to save and retrieve such information are also contemplated, such as a subscriber identity module (SIM) card.

Figure 3:
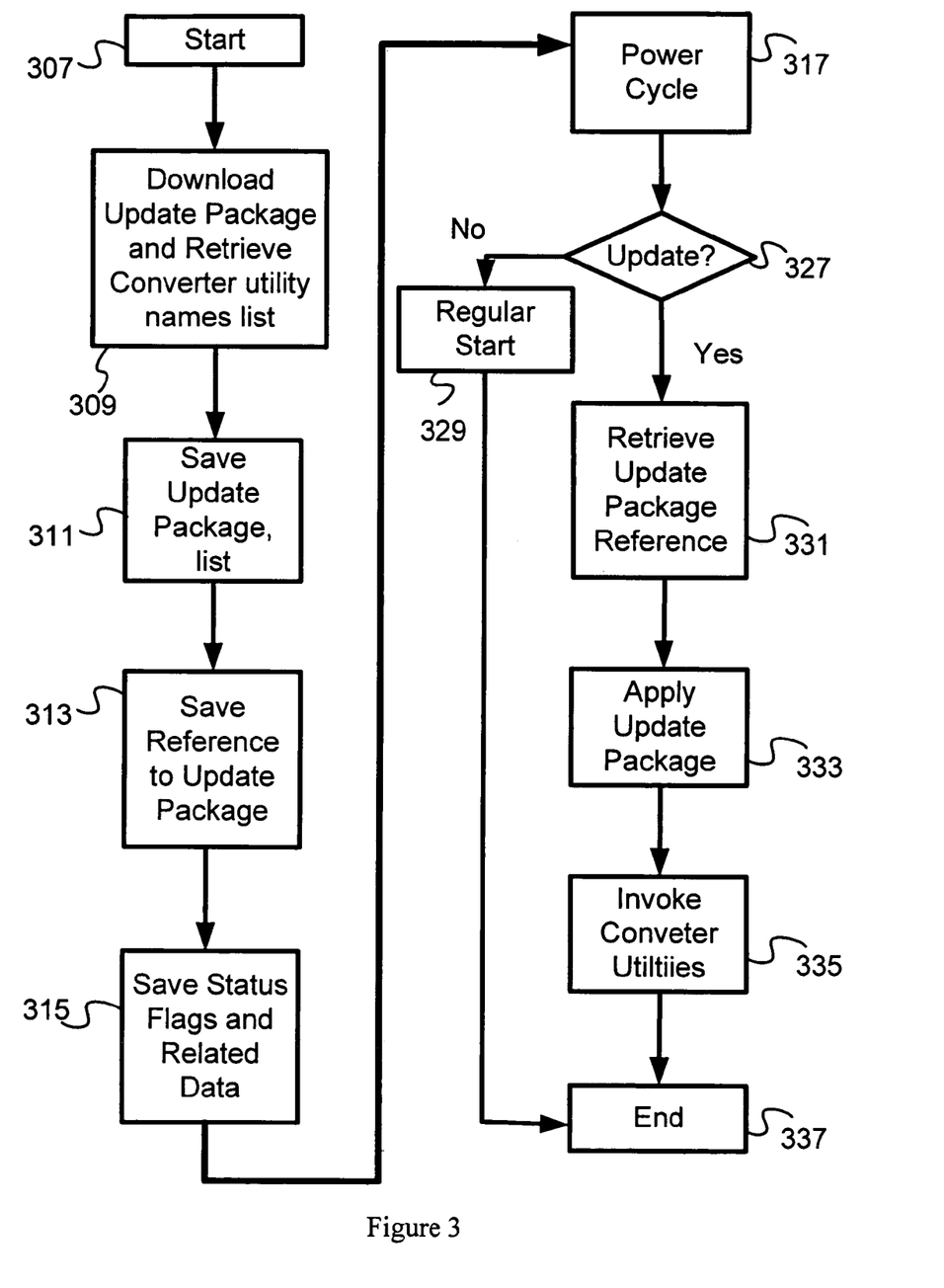
FIG. 3 illustrates a flow chart of an exemplary processing operation of the electronic device according to an embodiment of the present invention.

FIG. 3 illustrates a flow chart of an exemplary processing operation of an electronic device, such as, for example, the mobile handset 107 disclosed in FIG. 1, according to an embodiment of the present invention. The flow chart of FIG. 3 depicts a processing operation of mobile handset 107 wherein a downloaded update package, such as update package 137 and a list of names of converter utilities are saved in storage with an update package reference set, such as update package reference 209 of FIG. 2, or 117 of FIG. 1. The arrangement may permit the update package 137 and the list of names of the converter utilities to be referenced at the same time.

At block 307, processing starts when the mobile handset 107 is notified by an external system to update the firmware/software installed therein, or when a user initiates a firmware/software download. At block 309, the update package may be downloaded employing appropriate loaders, for example, loader modules 121, and data transport protocols contained in communication layer 113. Additionally, a list of names of converter utilities associated with the update package may also be downloaded.

At block 311, the update package 137 may be saved and the update package location in the file system may also be retrieved for populating update package reference 117. The list of names of converter utilities and a reference to the list and the components may be saved for retrieval.

At block 313, the location of the update package in the file system may be saved in an update package reference in the memory of the mobile handset. The update package reference may be located in a segment of memory to which the update agent, such as update agent 115 of FIG. 1, has access. Additionally, a reference to the list of names of converter utilities may also be saved in the update package reference 117.

In an embodiment of the present invention, when the update package reference is saved, mobile handset 107 may assemble a placement layout table (not shown) for the update package, mapping segments of the update package spread over at least one bank or sector of memory. The placement layout table, or a reference thereto, may also be saved in the update package reference 117.

At block 315, the update package reference may also be populated with CRC information, an address of a backup segment of memory, flags, etc., that facilitate the update process. A power cycle at block 317 may cause a transition to the update process.

During a reboot process, at decision block 327, an attempt may be made to determine whether a firmware/software update is to be executed. If it is determined that an update is not necessary, then control may be transferred to block 329 where a normal reboot operation for a regular start-up of the mobile handset may be conducted before update processing terminates at block 337.

If, at decision block 327, it is determined that an update is necessary, then control may be transferred to block 331, where update agent 115 retrieves the data in the update package reference 117, 209 and verifies the authenticity of the update package 137. Then, at block 333, the update agent 115 may apply the update package 137 to the firmware/software, such as the application software 129.

Later, at block 335, the list of names of converter utilities may be retrieved, and each of the converter utilities may be executed, for example, in the same order as software applications are executed, if necessary. Finally, the update process ends at block 337, where a confirmation of the update may be communicated to at least one external system and a reboot of the system may also be conducted (not shown in FIG. 3).

In an embodiment of the present invention, a default converter utility name such as, for example, "convert", that is supported by all software vendors in their respective newer versions of application software may be employed to convert their respective data. The update agent, in an embodiment of the present invention, may invoke the respective converter utility instance for each application after the application has been updated.

Installation of a single update package by an update agent may result in the update of a plurality of software applications. This may involve the invocation of a sequence of converter utilities for the software application(s) updated, each converting data for their respective software applications.

An embodiment of the present invention may be used to update the configuration parameters of a mobile handset. Such parameters may be set at a manufacturer's facility following a firmware/software update. A converter utility for configuration parameters may be employed to convert/modify the configuration parameters. The converter utility for the configuration parameters may either be available in the mobile handset or may be downloaded with an update package from server 109.

In another embodiment of the present invention, parameters set in the factory and that are specific for electronic devices belonging to a particular carrier network, such as, for example, radio link settings, power limits, etc., may be modified using an update package supplied by server 109.

Although a system and method according to the present invention has been described in connection with a preferred embodiment, the invention is not intended to be limited to the specific form set forth herein, but on the contrary, is intended to cover such alternative modifications and equivalents, as can be reasonably included within the spirit and scope of the invention, as defined by this disclosure and the appended diagrams. It is intended that the scope of the invention be limited not with this detailed description, but rather by the claims appended hereto.

What is claimed is:

1. A method for updating an electronic device, using an update package comprising update information, the method comprising:
   applying the update package to the electronic device by updating a first code version in the electronic device to a second code version, the update information comprising a set of instructions, wherein execution of the instructions transforms the first code version into the second code version; and
   invoking at least one converter utility for converting data associated with the first code version to a form compatible with the second code version, based upon the update information and a list of names of converter utilities associated with the update information.

2. The method according to claim 1, further comprising retrieving the list of names of converter utilities associated with the update information.

3. The method according to claim 1, further comprising storing update information in at least a portion of memory in the electronic device.

4. The method according to claim 1, further comprising communicating queries regarding availability of update information from the electronic device to a server.

5. The method according to claim 1, further comprising retrieving the update information and a list of names of converter utilities in a single retrieval operation.

6. The method according to claim 1, wherein the first code version comprises a plurality of software applications, and each of the plurality of software applications is associated with a corresponding converter utility.

7. The method according to claim 6, wherein the update information is capable of updating the plurality of software applications in a single update event.

8. The method according to claim 1, further comprising generating an update package reference, the update package reference at least comprising:
   an update package location memory reference; and
   a list of names of converter utilities memory reference.

9. The method according to claim 1, further comprising determining whether a code update is necessary, wherein if it is determined that an update is not necessary, then performing a reboot operation.

10. The method according to claim 1, further comprising determining whether a code update is necessary, wherein if it is determined that an update is necessary, then:
   retrieving data from an update package reference;

verifying authenticity of the update information;
updating the first code version;
executing at least one converter utility associated with at least one software application;
communicating an update confirmation to at least one external system; and
performing a reboot operation.

11. The method according to claim 10, wherein executing at least one converter utility associated with the at least one software application comprises retrieving and updating associated security information.

12. The method according to claim 11, wherein retrieving and updating associated security information comprises retrieving an authorization related object and associating it with the at least one software application.

13. The method according to claim 11, further comprising:
retrieving a list of security information associated with the update information; and
installing the security information after updating the first code version.

14. The method according to claim 10, wherein executing at least one converter utility associated with the at least one software application comprises converting security information comprising authentication and authorization information.

15. The method according to claim 10, wherein executing at least one converter utility associated with the at least one software application comprises converting subscription information.

16. The method according to claim 10, wherein the first code version comprises a plurality of software applications, and the at least one converter utility comprises a plurality of converter utilities, each converter utility being associated with a corresponding software application.

17. The method according to claim 16, wherein each of the software applications for which an update was determined to be necessary is updated in a single update event.

18. The method of claim 17, wherein executing at least one converter utility associated with the at least one software application further comprises converting data associated with each software application in a single conversion event.

19. The method according to claim 1 wherein code comprises firmware.

20. The method according to claim 1, wherein the electronic device comprises a mobile handset.

21. A machine-readable storage, having stored thereon a computer program having a plurality of code sections executable by a machine for causing the machine to perform operations for updating an electronic device using an update package comprising update information, the machine-readable storage comprising:
code comprising an update agent, for applying the update package to the electronic device by updating of code in the electronic device, the update information comprising a set of instructions, wherein execution of the instructions transforms the code to an updated code; and
code comprising a converter, for invoking at least one converter utility associated with the code and for converting data associated with the code to a form compatible with an updated version of the code, based upon the update information and a list of names of converter utilities associated with the update information.

22. The machine-readable storage according to claim 21, wherein the electronic device comprises a communication layer for communicating the list of names of converter utilities associated with the update information and communicating queries regarding availability of update information from the electronic device to a server.

23. The machine-readable storage according to claim 22, wherein the communication layer is adapted to communicate the update information and the list of names of converter utilities in a single communication event.

24. The machine-readable storage according to claim 21, wherein the electronic device comprises memory for storing update information.

25. The machine-readable storage according to claim 21, wherein the code comprises a plurality of software applications and each of the software applications is associated with a corresponding converter utility.

26. The machine-readable storage according to claim 25, wherein the update information is adapted to update the plurality of software applications in a single update event.

27. The machine-readable storage according to claim 21, further comprising a placement layout table for mapping a memory location of update information, the placement layout table at least mapping an update information memory location and a list of names of converter utility memory locations.

28. The machine-readable storage according to claim 21, further comprising means for determining whether an update of code is necessary, wherein if it is determined that an update is not necessary, then the electronic device performs a reboot operation.

29. The machine-readable storage according to claim 21, further comprising means for determining whether an update of code is necessary, wherein if it is determined that an update is necessary, then:
the update agent retrieves data from an update package reference, verifies authenticity of the update information, and updates the code;
the converter executes at least one converter utility associated with the code;
a communication layer communicates an update confirmation to at least one external system; and
the electronic device performs a reboot operation.

30. The machine-readable storage according to claim 29, wherein the code comprises a plurality of software applications, and the at least one converter utility comprises a plurality of converter utilities, each converter utility being associated with a corresponding software application.

31. The machine-readable storage according to claim 30, wherein the update agent is adapted to update each of the software applications for which an update was determined to be necessary, in a single update event.

32. The machine-readable storage according to claim 31, wherein the converter executes at least one converter utility associated with each software application and converts data associated with each of the software applications, in a single conversion event.

33. The machine-readable storage according to claim 21, further comprising:
the converter converts security data associated with the code, the converted security data enabling access to the updated version of the code.

34. The machine-readable storage according to claim 21, wherein the electronic device comprises a communication layer, the communication layer communicating converter utilities, the converter utilities adapted to converting security data and access control information associated with the update information, and the communication layer also communicating information associated with the converted security data and access control information from the electronic device to a server.

35. The machine-readable storage according to claim 34, wherein a converter utility invokes downloading of update information and firmware/software update information.

36. The machine-readable storage according to claim 21, wherein security information is updated after a software/firmware update has been performed.

37. The machine-readable storage according to claim 21, wherein a software application is updated when data associated with the software application changes.

38. The machine-readable storage according to claim 21 wherein code comprises firmware.

39. The machine-readable storage according to claim 21, wherein the electronic device comprises a mobile handset.

* * * * *